May 18, 1937. J. A. TEMPLEMAN 2,080,446
EGG GRADER
Filed May 7, 1934 3 Sheets-Sheet 1

INVENTOR
James A. Templeman
BY
G. Wright Arnold
ATTORNEY

May 18, 1937.  J. A. TEMPLEMAN  2,080,446
EGG GRADER
Filed May 7, 1934  3 Sheets-Sheet 2
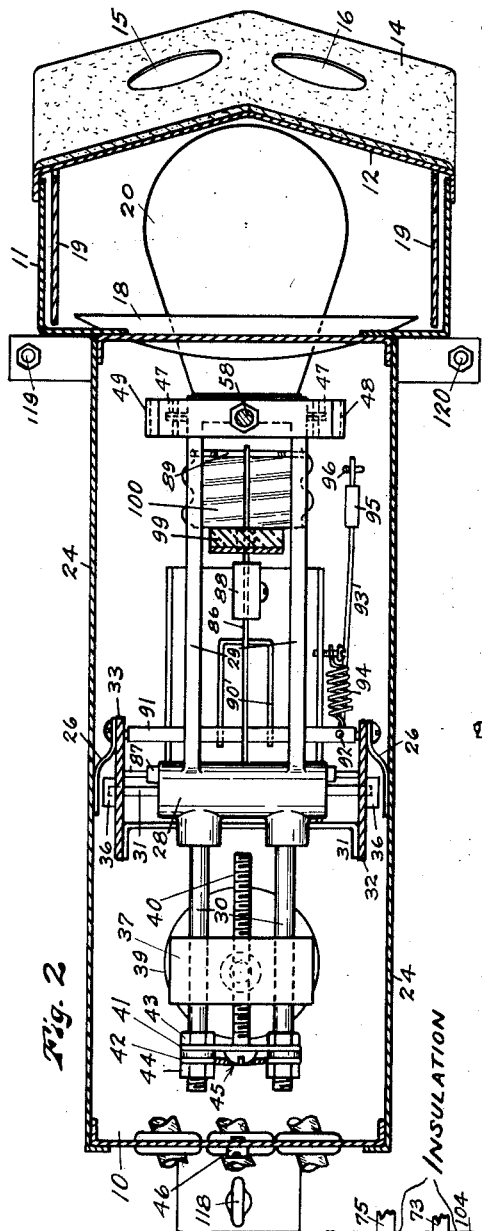
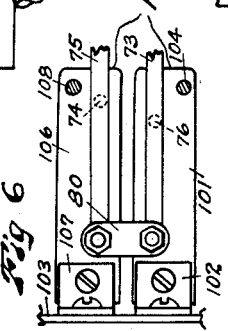
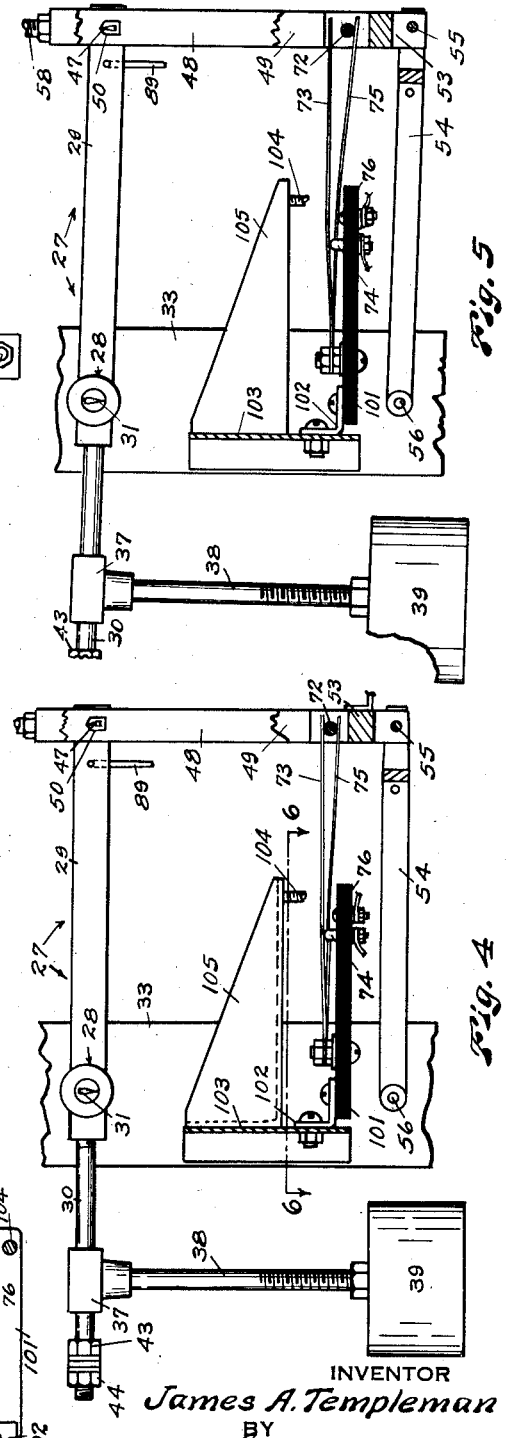
INVENTOR
James A. Templeman
BY
ATTORNEY May 18, 1937.  J. A. TEMPLEMAN  2,080,446
EGG GRADER
Filed May 7, 1934  3 Sheets-Sheet 3
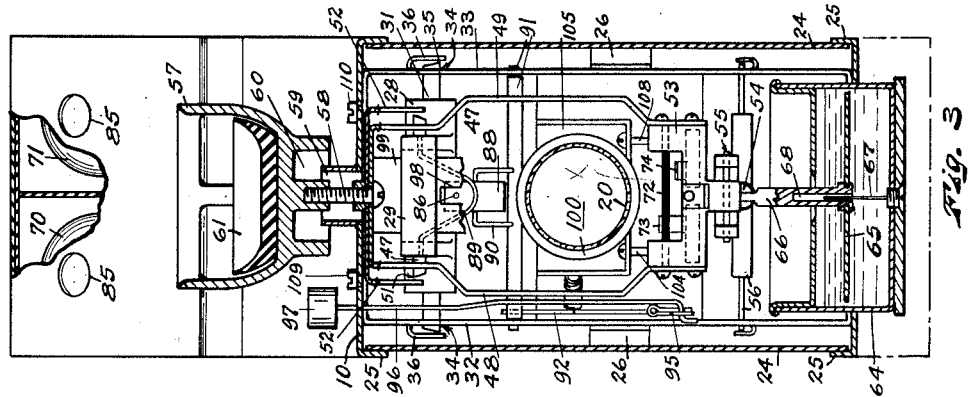
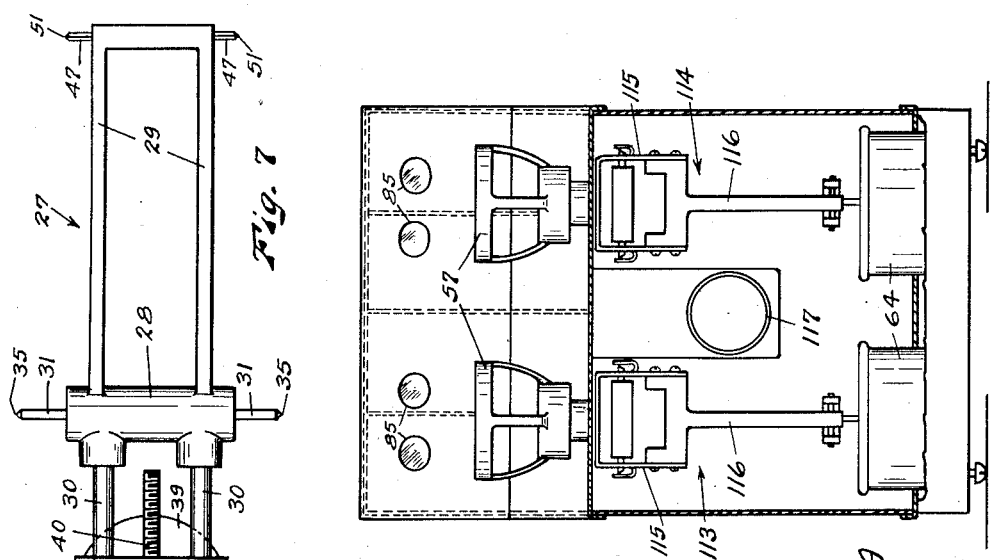
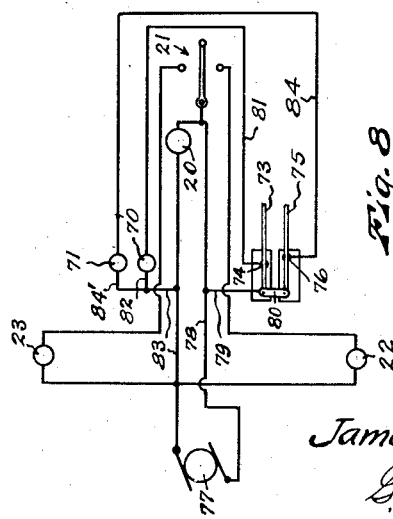
INVENTOR
James A. Templeman
BY
Gilbright Arnold
ATTORNEY Patented May 18, 1937

2,080,446

UNITED STATES PATENT OFFICE 2,080,446

EGG GRADER

James A. Templeman, Seattle, Wash., assignor, by direct and mesne assignments, to Grade-O-Lite, Inc., Seattle, Wash., a corporation of Washington Application May 7, 1934, Serial No. 724,264

11 Claims. (Cl. 265—49)

My invention relates to an egg grader. More particularly, my invention relates to a device for grading eggs according to the interior of the egg, the exterior of the egg, and the weight of the egg.

In determining the grade of an egg, the eggs are graded first from the exterior of the egg. In other words, if the egg shell is clean and white it is one grade. Whereas, if the shell is dirty or not a pure white color, it is of an inferior grade. Also grades are known as mixed colors, checks, etc. Then the interior of the egg is graded for yolk color, firmness, blood spots, and the amount of egg white of various densities. After the eggs are graded from the exterior and interior according to the shell and the contents, they are then graded according to weight.

According to common practice in many of the States, eggs weighing less than 15 ozs. per dozen are graded as "peewees". Eggs weighing from 15 to 19 ozs. to the dozen are graded as small eggs. Eggs weighing 19 to 22 ozs. to the dozen are graded as medium eggs. Eggs weighing over 22 ozs. to the dozen are graded as large or standard eggs. The weights of different grades may vary in different localities, but the requirements will ordinarily demand that eggs be segregated into three or more grades determined by weight.

In grading eggs, an expert worker will grade approximately 8,000 eggs during an eight hour day, and a device permitting the utmost speed is essential. The candling operation, or the operation in which the operators determine the grade of the egg according to its interior condition and its exterior surface is one which must be conducted in a dark room, as the operator must be able to look through the egg by means of lights positioned on the other side of the egg from the vision of the operator. In order to permit rapid grading, it is necessary that a candling device be operated in conjunction with a scale. As the room must be dark to permit accurate candling, signal means indicating the weight of the egg are of primary importance. As far as I am advised, no signal means, capable of operating in connection with a candling device and indicating the weights of eggs, has been available. I have provided a signal means which is readily perceptible to the operator, and yet the signal means in nowise conflicts with the light conditions for the candling of eggs.

As heretofore pointed out, the time permitted for the candling of an individual egg is a very short interval of time, and for that reason an egg grading device which will weigh in a short period of time is also essential. As the price of an individual egg is extremely low, the cost of weighing and determining the grade of the egg must be extremely low. Furthermore, the various bureaus governing the weight of eggs throughout the country will permit little variation and accurate weighing is essential. I have provided a scale which is rapid in operation, simple in construction, and which will maintain its accurate adjustment over long periods of time.

Eggs, of course, are extremely fragile, and even expert workers at times will accidently break an egg, and means must be provided to positively insure that such broken eggs will not enter the working parts of the scale and vary the accuracy of the scale. I have provided an enclosed device, having telescopically interfitting means preventing broken eggs from leaking into the scale mechanism and affecting the accuracy thereof. Besides the inaccuracies in weighing which may be caused by reason of the egg matter getting within the scale mechanism, other foreign particles, such as dust, moisture and the like will readily vary the accuracy of the scale and my enclosed scale mechanism prevents such foreign matter from interfering with the accuracy of the scale weighing mechanism.

It is well known that a balance type of scale will maintain its accuracy over a longer period of time than a spring type of scale. As a matter of fact, in many instances the departments governing weights throughout the country have condemned and will not permit the use of a straight spring scale. I have provided a balance type of scale with simple and efficient electrical contact devices, which electrical contact devices provide a minimum interference with the balance scale, and yet the electrical contact devices are economical in cost and highly efficient in operation.

Furthermore, I have provided a minimum number of signals to indicate the various grades of eggs, as well as auxiliary means permitting further unusual grading of the eggs.

Furthermore, I have provided means for separately adjusting each signal means so that the adjustment of one signal means does not materially vary the adjustment of the other signal means.

Furthermore, it is an object of my invention to provide an egg holding means which will readily receive eggs to be graded, and at the same time be in a form so that the accurate weight of the egg will be determined, regardless of the particular individual position at which a particular egg may rest.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in side elevation, with the side plates of the housing removed and parts shown in cross-section, of an egg grading device constructed in accordance with my invention;

Fig. 2 is a sectional view of the same substantially on a broken line 2—2 of Fig. 1, showing parts in plan;

Fig. 3 is a vertical sectional view substantially on broken line 3—3 of Fig. 1, showing parts in elevation;

Fig. 4 is a detached view in side elevation, with parts broken away and with other parts shown in section, of the scale beam and electrical contact mechanism;

Fig. 5 is a view similar to Fig. 4, showing the scale beam and electrical contact mechanism in a different operative position;

Fig. 6 is a detached view partly in plan and partly in section substantially on line 6—6 of Fig. 4, showing parts of the electrical contact mechanism;

Fig. 7 is a detached plan view of the scale beam mechanism;

Fig. 8 is a wiring diagram illustrating the electrical connections embodied in this egg grading device; and Fig. 9 is a view, partly in section and partly in front elevation, of a modification of the invention in which two scale mechanisms are positioned side by side and a support for a lamp is positioned between the two scale mechanisms.

In the following description the visual egg grading devices will be described first, and the egg weighing devices will be described later.

This egg grading device comprises generally a housing 10 upon the forward end of which is provided a lamp compartment or housing 11. This lamp compartment or housing 11 is preferably provided with a front side 12 of flattened V shape, which is further inclined from top to bottom so that the bottom edge 13 protrudes further toward the operator than the top edge thereof. A covering 14 of padding material, as felt, is preferably provided on the exterior of the side wall 12. Two sight openings 15 and 16 are provided in said front wall 12 on opposite sides of the vertex thereof.

The bottom side of the front compartment 11 is inclined upwardly from the housing toward the point 13 and said bottom side is provided with a light conductive or light transmitting plate 17, which is preferably of colored glass to provide a light assimilating as nearly as possible ordinary daylight. A concave reflector 18 is provided within the rear portion of the front housing 11 to reflect light outwardly through openings 15 and 16 and another reflector 19, of substantially inverted U shape, is also provided in said front housing 11 to reflect light downwardly through light conductive plate 17. A lamp globe 20 is supported within the front housing 11 in operative position as respects said two reflectors.

The inverted U shape reflector 19 directs the rays of lamp 20 downwardly through light conductive plate 17. By placing eggs below the plate 17 the operator is able to look at the eggs and examine their exterior. In operation, as this is substantially a color test, it is advisable for the operator to place a number of eggs below the plate 17 at the same time, so that the colors may be properly assorted by comparison. This may be accomplished by placing the egg grading device directly over a supply of eggs, such as a crate of eggs, so that the rays of lamp 20 will be directed against a number of eggs and the off-color eggs first removed before further candling is done. Generally a layer at a time from the usual crate of eggs will be sufficient number to permit the operator to properly select eggs as to exterior color. Thereafter the operator may place two eggs in either hand and by placing an egg over each of the openings 15 and 16 the operator may look through the eggs at the light 20 and perceive the interior contents of the egg. The art of candling eggs is extremely old, and the above sets forth only sufficient for a better understanding of the device herein disclosed.

The electrical switch 21, shown in Figure 1 and illustrated diagrammatically in Fig. 8, may be operated to selectively turn off and on two lamps, such as lamps 22 and 23. In the event that lamp 22 is placed to the left and lamp 23 to the right of the operator over supplies of eggs, the switch 21 is preferably connected so that a movement to the left by switch 21 will illuminate lamp 22, and movement to the right by switch 21 will illuminate lamp 23. By providing switch 21 in close proximity to the candling and grading devices, the operator may readily illuminate a supply of eggs, so that eggs may be carefully handled and at the same time not seriously interrupt the operator in the candling of eggs.

The main housing 10 forms a complete enclosure of the scale mechanism for the exclusion of dust and dirt and other foreign substances. This housing 10 is preferably provided with removable side plates 24, which may be slidably held by flanges 25 at the top and bottom of the said housing. These plates 24 are readily removable to afford access to the interior of the scale and may be maintained substantially dust tight by the outward pressure of the flat springs 26.

A scale beam, designated generally by numeral 27, is provided with a hub portion 28 having a forwardly extending rigid beam portion 29 and rearwardly extending relatively rigid rod portions 30. Two knife edge members 31 extend outwardly from the respective ends of the hub portion 28 and are pivotally mounted in upright spaced apart frame supports 32 and 33. The knife edges of the members 31 are directed downwardly and extend through suitable openings 34 in the supports 32 and 33 and form a main fulcrum for the scale beam. The ends of said knife edges are preferably inclined and form bearing points 35 in alignment with the axis of the fulcrum, which bearing points are operatively positioned as respects thrust members 36, thereby preventing sidewise displacement of the scale beam. The knife edge members 31 are preferably made of hardened steel and are secured by any suitable means to the hub portion 28.

The rods 30, which extend rearwardly from the hub 28, have a yoke 37 slidably mounted thereon. An arm 38 is rigidly secured to the yoke 37 and extends downwardly therefrom, preferably at substantially right angles to the scale beam. A weight 39 is preferably adjustably mounted on the lower end portion of the rod 38. The yoke 37 is adjustably supported on the rods 30 by a screw 40, which has its head positioned between two flexible plates 41 and 42 that are secured between suitable nuts 43 and 44 on the rods 30. The head of the screw 40 is frictionally held between plates 41 and 42 so that said screw will not turn or lose its adjustment during operation of the scale. A hole 45 in the plate 42 permits a screw driver to be inserted therethrough into engagement with the head 40 for adjusting said screw without loosening the nuts 44 or varying the friction of the plates 41 and 42 on the head of said screw. A hole in the rear wall of the housing 10, in alignment with screw 40, is normally closed by a screw 46, which may be removed to permit insertion of the blade of the screw driver, whereby the screw 40 may be adjusted from the exterior of the housing 10.

The weight 39 is thus rigidly suspended from one end portion of the scale beam. As the end of the scale beam carrying the weight 39 is raised, the weight 39 will travel through an arc and will increase the lever arm through which the weight travels. Thus, as articles of various weights are operatively engaged with the scale beam, the scale beam may be depressed in accordance with the weight of the articles. A weight which is sufficient to start the scale beam to move will only move it a predetermined amount, and an additional weight will be necessary to move the scale beam further. I have thus provided a member movable through a predetermined travel in accordance with the weight of the egg operatively engaging the balance beam.

The forward end of the scale beam 27 is provided with transversely projecting knife edge members 47, having their sharp or knife edges turned upwardly to provide a bearing for a weight supporting mechanism, which may be suspended on said knife edges. This weight supporting mechanism may be in the nature of a yoke having two side plates 48 and 49 provided with holes 50, which fit over and bear upon the knife members 47. Knife members 47 are tapered on the ends to provide points 51 in alignment with the knife edges of said knife members. These points take care of side thrust bearing against thrust members 52, see Fig. 3. The lower end portions of side plates 48 and 49 are secured to bracket member 53. A parallel link member 54 has one end pivotally connected with the bracket member 53, as by pivot pin means 55, and the other end pivotally connected, as by means 56, with the upright supports 32 and 33. This link member 54 is parallel with the scale beam and maintains the rod supporting mechanism, formed by side plates 48 and 49 and bracket 53, always in a substantially upright or vertical position. The object of this parallel link is to maintain the load carried on the knife edge members 47 immovable longitudinally considered of the scale beam. If the load carried on the knife members 47 is allowed to move longitudinally of the scale beam, the effective lever arm of the load will be changed and inaccurate weighing will result. By the use of such parallel link, no particular care need be used in placing the article to be weighed on its supporting member carried by the scale beam. The egg supporting cup 57 should be above the scale beam in a place where the eggs may be rapidly placed within the cup and rapidly removed therefrom. The particular shape of the eggs as they are placed on end may cause the eggs to have a tendency to move longitudinally of the scale beam. Therefore, a parallel link positively limiting the effective position of the weight should be used to provide accurate grading of eggs according to their weights.

A screw 58, rigidly secured to side plates 48 and 49, protrudes upwardly through a tubular member 59 and forms a stem on which the egg receiving cup 57 is mounted. The tube 59 is substantially larger than the screw 58 or other parts which operate in such tube, so that frictional contact with the walls of said tube is entirely avoided. This tube 59 projects upwardly into an annular recess 60 in the bottom of the egg cup. This recess is sufficiently large to avoid all frictional contact with the tube 59 and permits absolute freedom of vertical movement of the egg cup. The bottom end of the egg cup extends below the plane of the top end of the tube 59 and thereby cooperates with the tube 59 to form an efficient means for excluding foreign matter in the nature of broken eggs and the like from the interior of the scale.

The tube 59 and the portion of the egg cup which surrounds the annular recess 60 thus form two interfitting annular telescoping members which are always free from frictional engagement with each other and never permit broken eggs to run down over the sides of the egg cup through the inside of the tube 59 and enter the interior of the scale. A cushion member 61, formed of soft material as rubber, is provided within the egg cup to minimize the danger of breaking the eggs. The egg cup is made of suitable size and shape to receive and support an egg.

Upward movement of the forward end of the scale beam and parts connected therewith may be limited by engagement of the member 52 with the top of the housing 10. Downward movement of the forward end of said scale beam and parts connected therewith is limited by engagement of an angle bracket 62 with a fixed angle bracket 63 on the wall of the housing 10.

A dampening device to permit more rapid weighing may be used. This may be in the form of an oil chamber 64 and a plunger 65. The plunger 65 is of smaller size than the chamber 64 and provides a limited and restricted orifice between the plunger 65 and the sides of the oil chamber. A link 66 operatively connects the plunger 65 with the movable scale beam. This may be done by connecting the link 66 with the parallel link member 54. Means for maintaining the plunger 65 centrally as respects the oil chamber 64 may be provided in the form of an upwardly projecting pin 67, telescopically interfitting with but not contacting a recess 68 in the link 66. As the scale beam 27 and parts connected therewith move, the plunger 65 moves up and down in the oil chamber 64. The oil above or below the plunger 65 is displaced according to the direction of the travel of the plunger. As it is being displaced and travels through the restricted orifice between the plunger 65 and the oil chamber 64, the dampening device restricts the free movement of the scale beam. As the scale beam comes to a position of rest, and all tendency of oil to flow above or below the plunger 65 ceases, the scale beam is at rest without interference from the dampening device. Thus, the dampening device tends to take all shock and momentum and aids the scale beam in rapidly coming to a balance without undue oscillation, permitting rapid use of the scale beam. I am aware that dampening devices have been generally applied to scales. However, I believe the particular dampening device which I have shown is novel and not heretofore known to the art.

Throughout the greater portion of the year, the great majority of hen eggs will be small, medium, or large grade eggs. During that portion of the year when the young chickens first commence to lay, "peewees" will be found in appreciable numbers. It is an object of my invention to use a minimum number of signals indicating these various grades, so that the operator can rapidly and efficiently grade eggs according to weight, with little interference.

In the electrical diagram shown in Fig. 8 and in Figs. 1 and 3, I have illustrated two lamps 70 and 71 for indicating the grade of an egg according to its weight. Illumination of lamp 70 will indicate that the egg is a medium egg, while the illumination of both lamps 70 and 71 will indicate that the egg is a large egg. When the egg is placed on the scale and neither lamp is illuminated it will indicate that the egg is either a small or a "peewee" egg. The mechanism for illuminating the lamps is controlled by the movement of means 72, which is operatively connected with the scale beam. In the particular device shown in the drawings the operative connection of member 72 with the scale beam is illustrated by mounting said member 72 on the bracket member 53 (see Fig. 3) connected with the scale beam. The member 72 is thus movable with the scale beam 27. This member 72 is preferably composed of electrical insulating material, or is insulated from the remainder of the scale.

A relatively light leaf spring 73 is supported by the member 72 when the scale beam is in the position of rest shown in Figure 1. A contact 74 is placed below leaf spring 73 and operatively positioned in the path of travel of the leaf spring 73. When the scale beam is at rest the relatively light leaf spring 73 is urged upwardly by member 72 away from its contact 74. As member 72 moves downwardly by reason of the weight of an egg in the egg cup 57, the spring 73 will engage its contact 74. The scale mechanism has been indicated in this position in Fig. 4. Further downward movement of the member 72 will cause the member 72 to engage relatively light leaf spring 75 and urge the forward end portion of said spring 75 downwardly. The spring 75 is normally at rest away from its contact 76 and as the member 72 moves further downwardly from the position shown in Fig. 4 to the position in which it is shown in Fig. 5, electrical contact is then established between the contact member 76 and the spring 75.

Referring to the electrical diagram shown in Fig. 8, electrical contact between the spring 73 and the contact 74 will illuminate lamp 70, indicating that the egg is to be graded as a medium egg. When both lamps 70 and 71 are illuminated, the egg is graded as a large egg. It is to be noted that as the member 72 moves downwardly, it moves away from spring 73 and spring 73 maintains its contact with the contact member 74. Further downward movement of the member 72 causes the spring 75 to electrically engage its contact member 76 and illuminate lamp 71, the illumination of both lamps indicating that the egg is a large egg. In the electrical diagram, a source of electrical energy indicated by 77 is connected to springs 73 and 75 by means of conductors 78, 79 and 80. Contact member 74 is connected to conductor 81, through lamp 70, along conductor 82 and along conductor 83 to the source of energy 77. Electrical contact member 76 is connected to conductor 84, through lamp 71, along conductor 84', then along conductor 83 to the source of energy 77. Thus, contact between spring 73 and contact 74 will illuminate lamp 70 and contact between spring 75 and contact 76 will illuminate lamp 71.

In the operation of the device, the lamps 70 and 71 are preferably of different colors, such as red and green, so that the illumination of one or both lamps may be readily and quickly ascertained by the operator of the device. Also, preferably the lamps are sheltered within a housing 111 and only a small sight opening such as 85 is used to cause a minimum eye strain on the operator. This eye strain may be further reduced by providing plates 112 of ground glass, frosted glass, or other light restricting translucent material over the openings 85.

In the operation of the device, it is apparent that if no lamps are illuminated that the egg in the cup 57 weighs less than a certain amount, such as 19 ozs. a dozen. If one lamp is illuminated, such as lamp 70, it will indicate that the egg is a medium egg. If both lamps are illuminated, it will indicate that the egg is a large egg. With no lamp illuminated, the egg may be either a "peewee" or a small egg, and for further grading I have provided means for adding additional weight to the egg carrying end of the scale, so that such end may be readily depressed by the additional weight and the weight of the egg thereby closing the electrical circuits to a lamp to further indicate the grade of such small eggs. Such additional weight may be operated in the following manner: This additional weight means may be in the nature of an auxiliary weight beam 86, having one end pivotally supported at 87 and having a weight 88 mounted for longitudinal adjustment thereon. The forward end portion of the auxiliary weight beam 86 is positioned within a stirrup 89, which is pivotally connected with the scale beam 27 and swings freely therefrom but the forward end of said weight beam is normally free from contact with said stirrup 89. A lever member 90 fixedly secured to a transverse pivot shaft 91 is positioned to engage with the underside of the auxiliary weight beam 86 and hold the same in an elevated position clear of the stirrup 89. An L shaped lever arm comprising a downwardly extending portion 92 and a substantially horizontal portion 93 is also secured to the pivot shaft 91. A tension spring 94 is connected with the L shaped lever arm and operates to hold the lever member 90 in the raised position shown in Figure 1. A clip member 95 is provided on the forward end portion of the horizontal part 93 of the L shaped lever arm and is pivotally connected with an upright push rod 96, which extends upwardly through the top of the housing 10, preferably adjacent the forward end portion thereof and to one side of the egg cup 57. The upper end portion of push rod 96 is provided with a button 97 by which it may be depressed.

If the egg which is placed within the egg cup is of insufficient weight to illuminate either of the lamps 70 or 71, the operator may depress push rod 96, thus oscillating L shaped lever arm 92 and 93, moving lever arm 90 downwardly and releasing auxiliary weight bar 86. This permits the forward end portion of auxiliary weight arm 86 to rest within the stirrup 89 and adds a predetermined additional weight to the forward and egg carrying end of the scale beam 27. The amount of additional weight thus added to the egg carrying end of the scale beam, together with the weight of the egg which was heretofore insufficient to cause the egg carrying end of the balance beam to be depressed, will now be sufficient to cause the egg carrying end of the balance beam to be depressed a predetermined amount according to the weight of the egg. In the present device I have used a weight 88 which is sufficient so that eggs which are graded as small eggs, together with the additional weight 88, will be sufficient to move the egg carrying end of the balance beam down to a position to illuminate lamp 70, thus indicating that the egg is a small egg. Obviously, various weights may be used to operate either one or both signals, but I have found the above sufficient for practical needs. A weight which is sufficient to permit a small egg to carry the egg carrying end of the scale beam down sufficient to only illuminate the lamp 70 will be insufficient to cause the scale beam to move down far enough to illuminate lamp 70 when a "peewee" or an egg weighing less than 15 ozs. per dozen is placed in the egg cup.

It is an object of my invention to provide a minimum number of electrical contact devices operating in conjunction with the scale beam. By the use of this additional weight means, I permit the electrical contact devices illustrated to indicate a plurality of weights of eggs.

As the auxiliary weight arm 86 is positioned substantially in the medial plane of the scale, it is illustrated as passing through a slot 98, Figs. 1 and 3, in a depending support 99 which extends downwardly from the top of the housing 10 between the two spaced apart side members of the forward portion 29 of the main scale beam 27 and carries a suitable receptacle 100 for the base of the lamp 20. This support 99 is substantially narrower than the distance between the bars 29 of the forward portion of the scale beam, whereby there will be no danger of the scale beam contacting this support.

The side plate members 48 and 49, which form a portion of the weight supporting means at the forward end of the scale beam, are spaced apart as shown in Fig. 3, a sufficient distance to permit the base portion of the lamp 20 to extend therebetween without danger of contacting any of the moving parts of the scale beam or in any other way interfering with the free operation of said scale beam. In this manner means are provided for positioning the lamp 20 partially within the main scale housing 10 so that the front portion of the forward housing 11 may be placed as near to the front end of the scale housing as possible, thus economizing on space and bringing the sight openings 15 and 16, through which the candling is done, as close as possible to the egg weighing cup 57 to minimize the distance of movement and the amount of effort necessary in handling eggs between the candling device and the egg weighing cups. As eggs are handled at the rate of approximately 8000 a day by the candler, the distance between the candling device and the weighing device must be reduced to an absolute minimum to facilitate rapid operation.

Contact 74 and leaf spring 73 may be supported on a plate 101 of insulating material which is secured by a spring bracket 102 to a fixed supporting member 103. The outer end of plate 101 is adjustably supported by a screw 104 which extends downwardly from a relatively fixed bracket member 105 positioned above said plate 101. Screw 104 is threaded through plate 101 and exerts a force opposed to spring bracket 102 which tends to urge the forward end of plate 101 downwardly. By turning screw 104 the forward end of plate 101 together with contact 74 and leaf spring 73 may be adjusted vertically to secure various vertical positions of leaf spring 73 relative to member 72.

In a similar manner contact member 76 and leaf spring 75 are secured to a plate 106 of insulating material, the rear end of which plate is secured by a spring bracket 107 to the fixed support 103. Another adjusting screw 108 extends downwardly from fixed bracket 105 and is threaded through the forward end of plate 106, whereby the forward end of plate 106, together with contact member 76 and leaf spring 75 may be adjusted vertically to selectively position the outer end of leaf spring 75 relative to member 72. This provides a separate and independent adjustment for each of the leaf spring members 73 and 75, whereby either of said leaf spring members may be adjusted without disturbing the adjustment of the other leaf spring member in any way. This adjustment is desirable as it provides for turning on the signal light at adjustable positions in the vertical movement of the scale beam. Furthermore, as leaf spring 73 is positioned above member 72 and comes to rest in the downward travel of 72, as the member 72 engages the leaf spring 75, the adjustment of the vertical position of the forward end portion of leaf spring 73 or leaf spring 75 will be independent and the adjustment of one will not affect the adjustment of the other.

For external adjustment of the screws 104 and 108 I preferably provide suitable openings in the top of the housing 10, which openings are normally closed by readily removable screws 109 and 110.

The housing 10 of the grading device is supported by three adjustable screws 118, 119 and 120. First, the device is leveled and then balanced so that predetermined weights will operate the signals, as has been hereinbefore described. In the event the scale is moved to another position, the adjusting screws 118, 119 and 120 must be adjusted to level the grader or the scale mechanism will not operate, as has been theretofore adjusted. Such adjusting screws operating to level a device are known in the art and are set forth only as a matter of completeness.

Fig. 9 illustrates an alternative form of the invention in which two egg weighing scales, designated generally by 113 and 114, are provided in side by side relation. These scales may be duplicates of the scale hereinbefore described, except as to the forward end or egg supporting portions of the scale beams thereof. Many of the details of these scales are not illustrated in Fig. 9 as they are duplicates of the parts heretofore shown and described. In these scales the same egg supporting cups 57 are used, but the parts upon which these egg supporting cups are mounted are of different construction and may each consist of an inverted U shaped bracket 115 secured to an upright bar member 116, which replaces the parts 48, 49 and 53 shown and described in connection with the preceding figures. The bar members 116 are spaced far enough apart so that a lamp mounting 117 may be supported between the two scales to allow a lamp, similar to the lamp 20, to extend rearwardly between said two supports 116 and thus provide for minimum distance between the egg candling openings and the egg cups as hereinbefore described in connection with Figs. 1 and 2.

The remaining parts of the double scale shown in Fig. 9 are duplicates of the parts illustrated and described in connection with Figs. 1 to 8, inclusive. For that reason, it is not deemed advisable to further illustrate or describe the same at this point.

In the adjustment of my device, more particularly referring to the devices shown in Figs. 1 to 8, inclusive, the weight 39, which is suspended from the scale beam is preferably adjusted on the arm 38 to allow a sufficiently long lever arm. A limited movement of the egg carrying end of the scale is desirable to provide for maximum speed in the operation. To obtain accuracy over such a short travel it is desirable to have a relatively long lever arm through which the weight 39 operates. Thereafter a predetermined weight is placed on the egg cup 58, such weight being the minimum weight of a large egg. The adjusting screw 40 is then moved, moving the arm 38 and the weight 39 longitudinally to a position where the egg cup 57 will move downwardly almost but not entirely to the limit of its travel. With such weight in the egg cup, the adjusting screw 108 is turned until lamp 71 is illuminated by the weight in the egg cup 57. Then a weight equal to the minimum weight of a medium egg is placed in the egg cup 57 and the screw 104 is adjusted so that lamp 70 is illuminated by the weight of such an egg on the egg cup 57.

The foregoing adjustments illustrate one means of using the various adjustments set forth in the scale. Other modes of operation are obviously inherent in the structure herein set forth.

Obviously, changes may be made in the forms, dimensions and arrangement of the parts of my invention, without departing from the principle thereof, the above setting forth only preferred forms of embodiment.

I claim:

1. In an egg grader, a member movable through a predetermined travel in accordance with the weight of an egg; a relatively light leaf spring fixedly secured at one end portion and having a movable portion positioned in the path of travel of said movable member; an electrical contact means positioned in the path of travel of the movable portion of the said spring and positioned to contact said spring at a predetermined position in the travel of said spring; electrically controlled signal means; and an electrical operating circuit for said signal means, including therein an electrical connection established by contact between the said spring and the said electrical contact means, whereby the operation of said signal means will indicate that the weight of an egg is at least the predetermined amount.

2. In an egg grader, a member movable through a predetermined travel in accordance with the weight of an egg; a relatively light leaf spring fixedly secured at one end portion and having a movable portion positioned in the path of travel of said movable member and positioned above and supported by said movable member during a predetermined initial portion of the travel of said movable member; another relatively light leaf spring fixedly secured at one end portion and having a movable portion positioned in the path of travel of said movable member and positioned below and engageable with said movable member during a predetermined final portion of the travel of said movable member; electrical contact means operatively associated with said spring; other electrical contact means operatively associated with said other spring; a plurality of electrically controlled signal means; an electrical operating circuit for one of said signal means, including therein an electrical connection established by contact between said spring and the one of said electrical contact means associated therewith; and another electrical operating circuit for other of said signal means, including therein an electrical connection established by contact between the said other spring and by other of said electrical contact means associated with said other spring.

3. An egg grader comprising a balance beam; weight means rigidly suspended from one end portion of said beam; egg supporting means carried by the other end portion of said beam; link means pivotally suspended from the egg carrying end of said balance beam, whereby the link means will be moved vertically in accordance with the weight of an egg; a transverse member carried by said link; a relatively light leaf spring having a free end positioned over said transverse member and being operatively positioned to maintain engagement between the spring and the transverse member for only a predetermined portion of the initial downward travel of the transverse member; electrical contact means positioned below and in a predetermined position in the path of movement of the movable portion of said spring; electrically controlled signal means; and an electrical operating circuit for said signal means including therein an electrical connection established by contact between the said spring and the said electrical contact means, whereby the operation of said signal means will indicate that the weight of an egg is at least a predetermined amount and the further downward movement of said transverse link will not in anywise be effected by the said spring.

4. An egg grader comprising a balance beam; weight means rigidly suspended from one end portion of said beam; egg supporting means carried by the other end portion of said beam; link means pivotally suspended from the egg carrying end of said balance beam, whereby the link means will be moved vertically in accordance with the weight of an egg; a transverse member carried by said link; a relatively light leaf spring having a free end positioned over said transverse member and being operatively positioned to maintain engagement between the spring and the transverse member for only a predetermined portion of the initial downward travel of the transverse member; electrical contact means positioned below and in a predetermined position in the path of movement of the movable portion of said spring; electrically controlled signal means; an electrical operating circuit for said signal means including therein an electrical connection established by contact between the said spring and the said electrical contact means, whereby the operating of said signal means will indicate that the weight of an egg is at least a predetermined amount and the further downward movement of said transverse link will not in anywise be effected by the said spring; another relatively light leaf spring having a free end positioned below said transverse member and being operatively positioned to engage the transverse member during a predetermined portion of the final downward travel of the transverse member; other electrical contact means positioned below and in a predetermined position in the path of movement of the movable portion of said other spring; another electrically controlled signal means; and another electrical operating circuit for said other signal means, including therein an electrical connection established by contact between the said other spring and the said other electrical contact means, whereby the operation of said other signal means will indicate that the weight of an egg is at least a predetermined amount.

5. In a device of the class described, a frame member; an electrical switch base secured to said frame; an electrical contact means on said base; a relatively light leaf spring extending beyond said contact means, said spring being at rest in engagement with said contact means; another contact means; another relatively light leaf spring extending beyond said other contact means, said other spring being at rest out of engagement with said other contact means; electrically controlled signal means; an electrical operating circuit for said signal means including therein an electrical connection established by contact between the spring and contact means; another electrically controlled siginal means; another electrical operating circuit for said other signal means including therein an electrical connection established by contact between the other spring and the other contact means; and a member movable through a predetermined travel in accordance with the weight of an egg having means engageable with and operatively disposed between the free ends of the said spring and the said other spring.

6. In a device of the class described, a frame member; an electrical switch base hingedly secured at one end to said frame; a relatively light leaf spring extending beyond said contact means in the opposite direction to the hinged connection between the switch base and the frame member, said spring being at rest in engagement with said contact means; another contact means; another relatively light leaf spring extending beyond said other contact means in the opposite direction to the hinged connection between the switch base and the frame member, said other spring being at rest out of engagement with said other contact means; adjustable means supporting the end of the electrical switch base, which end is opposite to the end hingedly secured to said frame; electrically controlled signal means; an electrical operating circuit for said signal means including therein an electrical connection established by contact between the spring and contact means; another electrically controlled signal means; another electrical operating circuit for said other signal means including therein an electrical connection established by contact between the other spring and the other contact means; and a member movable through a predetermined travel in accordance with the weight of an egg having means engageable with and operatively disposed between the free ends of the said spring and the said other spring.

7. An egg grader comprising a frame member; a substantially horizontal balance beam pivotally mounted on said frame member; weight means rigidly suspended from one end portion of said beam; a substantially horizontal link means pivotally connected with said frame member and extending in a plane parallel to and in the same direction as the plane of the end portion of the balance beam which is opposed to the end portion carrying the weight means; a case member enclosing said frame, balance beam, weight means and horizontal link, said case member being provided with an aperture; externally positioned upwardly extending annular member surrounding said aperture; vertical link means, passing through said aperture, pivotally connected to said balance beam on the end portion opposite to that end portion supporting the weight means, said vertical link means also pivotally connected to said horizontal link means on the end portion opposite to the connection between the horizontal link means and the frame member, whereby the movement of the said vertical link will be limited to a vertical plane; an egg supporting means carried by said vertical link means; and a downwardly projecting annular member, carried by said egg supporting member, of a size to telescopically interfit and not contact with the upwardly extending annular member.

8. In a device of the class described, a balance beam; weight means slidingly mounted on one end portion of the balance beam; stop means on said end portion of the balance beam; screw means threadedly connected with said weight means and having a head engaging said stop means; a flexible member secured to said end of the balance beam and engaging and resiliently urging said head against the stop means, whereby the said head may be turned to adjustably position the weight means and turning of the screw is resisted by said flexible member; and egg supporting means carried by the other end of the balance beam.

9. In an egg grader, a balance beam; weight means rigidly suspended from one end portion of the balance beam; egg supporting means carried by the other end portion of the balance beam; a plurality of signal means operable at predetermined positions of the balance beam; pivotally mounted weight means normally out of engagement with the balance beam; lever means operatively engaging the pivotally mounted weight means with the balance beam; and lever return means urging the lever means to an inoperative position and the weight means to said normal position, whereby the signal means will normally indicate certain predetermined weights and will indicate other predetermined weights when the lever means are being operated.

10. In a device of the class described, a balance beam; signal lamp means illuminated by predetermined movements of said balance beam, vertical link means pivotally secured to one end portion of said balance beam, said link means having two vertically spaced apart members affording space therebetween for a candling lamp; and an egg supporting cup carried by said vertical link, whereby provision is made for a candling lamp in close proximity to the egg supporting cup operatively connected with a balance beam, providing for grading of eggs by candling and weighing in a darkened room.

11. In an egg grader, a movable member movable through a predetermined travel in accordance with the weight of an egg; another member having a movable portion positioned in the path of travel of said movable member and positioned for contact with and supported by said movable member during a predetermined portion of the travel of said movable member; stop means limiting the travel of the movable portion of said other member; electrical contact means operatively associated wtih said movable portion of said other member; an electrically controlled signal means; and an electrical operating circuit for said electrically controlled signal means including therein electrical connection established by contact between said other member and the electrical contact means associated therewith.

JAMES A. TEMPLEMAN.